United States Patent Office 3,003,978
Patented Oct. 10, 1961

3,003,978
A COATING COMPOSITION COMPRISING A CELLULOSE DERIVATIVE, AN EPOXIDIZED OIL AND AN AMINE-ALDEHYDE RESIN
Kenneth R. Coney, Pennsville, N.J., Richard B. Pyewell, Media, Pa., and William B. Webb, Jr., Pitman, N.J., assignors to E. I. du Pont de Nemours and Company, Wilmington, Del., a corporation of Delaware
No Drawing. Filed June 6, 1958, Ser. No. 740,191
5 Claims. (Cl. 260—15)

This application relates to novel coating compositions containing cellulose derivative film-formers and having a very high resistance to attack by organic solvents and corrosive chemicals as well as improved physical properties. More particularly, this application relates to chemical-resistant cellulose derivative lacquers, especially industrial lacquers, containing a cured epoxidized compound.

Lacquers and similar coating compositions in which a cellulose derivative, such as nitrocellulose, ethyl cellulose, cellulose acetate, cellulose acetate butyrate, and the like, is the principal film-forming component have long been known and used in the art. Protective coatings and films formed from such coating compositions have excellent properties in many respects and such compositions have gained wide-spread acceptance in the field for many coating uses. One of the principal disadvantages of such compositions is their relatively poor resistance to attack by organic solvents and corrosive chemicals. Were it not for this drawback, coating compositions having cellulose derivative film-formers would have achieved even wider use than they have to date.

It is a principal object of the present invention to provide novel cellulose derivative coating compositions having improved resistance to attack by organic solvents and corrosive chemical materials, and having improved physical properties.

It is a further object of the invention to provide such coating compositions which are economical to manufacture and convenient to use. Other and additional objects of the invention will become apparent from a consideration of the ensuing specification and claims.

The foregoing objectives are accomplished by incorporating into the cellulose derivative coating composition a suitable portion of epoxidized triglyceride of soya bean oil or epoxidized acetylated triglyceride of castor oil plus a resinous urea-formaldehyde, melamineformaldehyde, or benzoguanamine-formaldehyde curing agent for the epoxy material.

The epoxidized triglyceride of soya bean oil and epoxidized acetylated triglyceride of castor oil are readily available commercial chemicals which are produced industrially by the reaction of hydrogen peroxide or peracetic acid with unsaturated fatty acid esters and the oils.

In our coating compositions, the epoxidized material is cured with a urea-formaldehyde melamine-formaldehyde, or benzoguanamine-formaldehyde resin, as will be more particularly hereinafter described. The coating composition may also contain a catalyst for hastening the cure. Many of a variety of other optional additives commonly used in coating compositions may also be present in addition to the solvent system in which the solid components are dispersed.

A more complete understanding of the invention may be gained from a consideration of the following examples.

In Examples I to III which follow, the improvement of the present invention is illustrated in connection with nitrocellulose-based lacquers, which represent a preferred embodiment of the invention. In all of these examples, the following solvent system was used unless otherwise indicated:

| | Parts by weight |
|---|---|
| SD–2B Ethanol | 11.4 |
| Toluene | 39.0 |
| Xylene | 15.3 |
| Methyl isobutyl ketone | 19.6 |
| Butyl "Cellosolve"[1] | 14.7 |

[1] Glycol butyl ether manufactured by Union Carbide Chemicals Company.

EXAMPLE I

A lacquer was prepared by dissolving the following solid components in the solvent on a 80/20 solvent-to-solids weight basis:

| | Parts by weight |
|---|---|
| Nitrocellulose (12.0% nitrogen), type HB 14 E, manufactured by E. I. de Pont de Nemours and Co., Inc | 100 |
| "Admex" 710, epoxidized triglyceride of soya bean oil manufactured by the Archer-Daniels-Midland Co. (epoxide value 0.37, molecular weight approximately 1000) | 50 |
| "Uformite" F–200–E, mutanol-modified urea-formaldehyde resin manufactured by Rohm & Hass Co. | 50 |
| Dibutyl phthalate | 25 |
| Monobutyl acid orthophosphate | 5 |

EXAMPLE II

A lacquer was prepared by dissolving the following solid components in the solvent on an 80/20 solvent-to-solids weight basis:

| | Parts by weight |
|---|---|
| Nitrocellulose (12.0% nitrogen), type HB 14 E, manufactured by E. I. du Pont de Nemours and Co., Inc | 100 |
| "Admex" 710, epoxidized triglyceride of soya bean oil manufactured by the Archer-Daniels-Midland Co. (epoxide value 0.37, molecular weight approximately 1000) | 50 |
| "RC–718," butanol-modified urea-formaldehyde resin, manufactured by E. I. du Pont deNemours and Co., Inc | 50 |
| Dibutyl phthalate | 25 |

EXAMPLE III

A lacquer was prepared by dissolving the following solid components in the solvent on an 80/20 solvent-to-solids weight basis:

| | Parts by weight |
|---|---|
| Nitrocellulose (12.0% nitrogen), type HB 14 E, manufactured by E. I. du Pont de Nemours and Co., Inc. | 100 |
| "Admex" 710, epoxidized triglyceride of soyabean oil manufactured by the Archer-Daniels-Midland Co. (epoxide value 0.37, molecular weight approximately 1000) | 76 |
| "Uformite" 158, propanol-modified urea-formaldehyde resin, manufactured by Rohm & Haas Company | 50 |
| Monobutyl acid orthophosphate | 5 |

EXAMPLE IV

A lacquer was prepared by dissolving the following solid components in the solvent on an 80/20 solvent-to-solids weight basis:

| | Parts by weight |
|---|---|
| Nitrocellulose (12.0% nitrogen), type HB 14 E, manufactured by E. I. du Pont de Nemours and Co., Inc. | 100 |
| "Estynox" 308, epoxide of the acetylated triglyceride of castor oil manufactured by the Baker Castor Oil Co. (epoxide value 0.181, molecular weight 1,081) | 50 |
| "Uformite" 158, propanol-modified urea-formaldehyde resin manufactured by Rohm & Haas Company | 50 |
| Dibutyl phthalate | 26 |
| Monobutyl acid orthophosphate | 5 |

EXAMPLE V

A lacquer was prepared by dissolving the following solid components in the solvent on an 80/20 solvent-to-solids weight basis:

| | Parts by weight |
|---|---|
| Nitrocellulose (12.0% nitrogen), type HB 14 E, manufactured by E. I. du Pont de Nemours and Co., Inc. | 100 |
| "Admex" 710, epoxidized triglyceride of soya bean oil manufactured by the Archer-Daniels-Midland Co. (epoxide value 0.37, molecular weight approximately 1000) | 50 |
| "Uformite" MM-55, butanol-modified melamine-formaldehyde resin, manufactured by Rohm & Haas Company | 50 |
| Dibutyl phthalate | 25 |
| Monobutyl acid orthophosphate | 5 |

EXAMPLE VI

A lacquer was prepared by dissolving the following solid components in the solvent on an 80/20 solvent-to-solids weight basis:

| | Parts by weight |
|---|---|
| Nitrocellulose (12.0% nitrogen), type HB 14 E, manufactured by E. I. du Pont de Nemours and Co., Inc. | 100 |
| "Admex" 710, epoxidized triglyceride of soya bean oil manufactured by the Archer-Daniels-Midland Co. (epoxide value 0.37, molecular weight approximately 1000) | 50 |
| Butanol-modified benzoguanamine-formaldehyde resin | 50 |
| Dibutyl phthalate | 25 |
| Monobutyl acid orthophosphate | 5 |

EXAMPLE VII

A lacquer was prepared by dissolving the following solid components in a solvent on an 80/20 solvent-to-solids weight basis. (The carbon black was dispersed in the lacquer by methods well known to the art):

| | Parts by weight |
|---|---|
| Nitrocellulose (12.0% nitrogen), type HB 14 E, manufactured by E. I. du Pont de Nemours and Co., Inc. | 100 |
| "Admex" 710, epoxidized triglyceride of soya bean oil manufactured by the Archer-Daniels-Midland Co. (epoxide value 0.37, molecular weight approximately 1000) | 50 |
| "Uformite" F-200-E, butanol-modified urea-formaldehyde resin, manufactured by Rohm & Haas Company | 50 |
| Dibutyl phthalate | 25 |
| Carbon black (pigment) | 11.25 |
| Monobutyl acid orthophosphate | 5.0 |

EXAMPLE VIII

A lacquer was prepared by dissolving the following solid components in a solvent on an 80/20 solvent-to-solids weight basis:

| | Parts by weight |
|---|---|
| Nitrocellulose (12.0% nitrogen), type HB 14 E, manufactured by E. I. du Pont de Nemours and Co., Inc. | 100 |
| "Admex" 710, epoxidized triglyceride of soya bean oil manufactured by the Archer-Daniels-Midland Co. (epoxide value 0.37, molecular weight approximately 1000) | 50 |
| "RC-718," butanol-modified urea-formaldehyde resin, manufactured by E. I. du Pont de Nemours & Co., Inc. | 50 |
| Monomethyl acid orthophosphate | 5 |

In the lacquer formulations described in Examples I through VIII, the solids components were dissolved and dispersed in the solvent system by conventional and well-known techniques. When used, the catalyst for curing the epoxidized material with the resin, i.e., a monoalkyl acid orthophosphate or citric acid, is not added simultaneously with the other components but rather is added shortly before the lacquer is to be used.

Examples IX to XVII, which follow, illustrate the invention in connection with cellulose derivative coating compositions other than nitrocellulose lacquers. In all of these examples, the following solvent system was used unless otherwise indicated:

| | Parts by weight |
|---|---|
| SD-2B ethanol | 11.4 |
| Toluene | 54.3 |
| Methyl ethyl ketone | 19.6 |
| Butyl "Cellosolve"[1] | 14.7 |

[1] Glycol butyl ether manufactured by Union Carbide Chemicals Company.

EXAMPLE IX

A lacquer was prepared by dissolving the following solid components in the solvent on an 80/20 solvent-to-solids weight basis:

| | Parts by weight |
|---|---|
| Cellulose acetate butyrate (37% butyral, 13% acetyl, 2% hydroxyl, viscosity 112–1880 centipoises) | 100 |
| "Admex" 710, epoxidized triglyceride of soya bean oil manufactured by the Archer-Daniels-Midland Co. (epoxide value 0.37, molecular weight approximately 1000) | 50 |
| "RC-718," butanol-modified urea-formaldehyde resin, manufactured by E. I. du Pont de Nemours and Co., Inc. | 50 |
| Dibutyl phthalate | 25 |
| Monobutyl acid orthophosphate | 5 |

EXAMPLE X

A lacquer was prepared by dissolving the following solid components in the solvent on an 80/20 solvent-to-solids weight basis:

| | Parts by weight |
|---|---|
| Ethyl cellulose (42.5–43.5% ethoxyl, 22 centipoises) | 100 |
| "Admex" 710, epoxidized triglyceride of soya bean oil, manufactured by the Archer-Daniels-Midland Co. (epoxide value 0.37, molecular weight approximately 1000) | 50 |
| "RC-718," butanol-modified urea-formaldehyde resin manufactured by E. I. du Pont de Nemours Co., Inc. | 50 |
| Dibutyl phthalate | 25 |
| Monobutyl acid orthophosphate | 5 |

EXAMPLE XI

A lacquer was prepared by dissolving the following solid components in the solvent on an 80/20 solvent-to-solids weight basis:

| | Parts by weight |
|---|---|
| Ethyl cellulose (42.5–43.5% ethoxyl, 22 centipoises) | 100 |
| "Admex" 710, epoxidized triglyceride of soya bean oil | 50 |
| "Uformite" F–158, propanol-modified urea-formaldehyde resin manufactured by Rohm & Haas Company | 50 |
| Monobutyl acid orthophosphate | 5 |

EXAMPLE XII

A lacquer was prepared by dissolving the following solid components in the solvent on an 80/20 solvent-to-solids weight basis:

| | Parts by weight |
|---|---|
| Ethyl cellulose (46.8–48.5% ethoxyl, 22 centipoises) | 100 |
| "Admex" 710, epoxidized triglyceride of soya bean oil | 50 |
| "RC-718," butanol-modified urea-formaldehyde resin | 50 |
| Dibutyl phthalate | 10 |
| Monobutyl acid orthophosphate | 5 |

EXAMPLE XIII

A lacquer was prepared by dissolving the following solid components in the solvent on an 80/20 solvent-to-solids weight basis:

| | Parts by weight |
|---|---|
| Cellulose acetate butyrate (26% butyral, 20.5% acetyl, 2.5% hydroxyl, 900–1350 centipoises) | 100 |
| "Admex" 710, epoxidized triglyceride of soya bean oil | 50 |
| "RC-718," butanol-modified urea-formaldehyde resin | 50 |
| Dibutyl phthlate | 10 |
| Monobutyl acid orthophosphate | 5 |

EXAMPLE XIV

A lacquer was prepared by dissolving the following solid components in the solvent on an 80/20 solvent-to-solids weight basis:

| | Parts by weight |
|---|---|
| Cellulose acetate butyrate (26% butyral, 20.5% acetyl, 2.5% hydroxyl, 900–1350 centipoises) | 100 |
| "Admex" 710, epoxidized triglyceride of soya bean oil | 50 |
| "Uformite" F–158, Propanol-modified urea-formaldehyde resin | 50 |
| Monobutyl acid orthophosphate | 5 |

EXAMPLE XV

A lacquer was prepared by dissolving the following solid components in the solvent on an 80/20 solvent-to-solids weight basis:

| | Parts by weight |
|---|---|
| Ethyl cellulose 42.5–43.5% ethoxyl, 22 centipoises) | 100 |
| "Admex" 710, epoxidized triglyceride of soya bean oil | 100 |
| "Uformite" F–200–E, butanol-modified urea-formaldehyde resin manufactured by Rohm & Haas Company | 40 |
| Dibutyl phthalate | 12.5 |
| Monobutyl acid orthophosphate | 4 |

EXAMPLE XVI

A lacquer was prepared by dissolving the following solid components in the solvent on an 80/20 solvent-to-solids weight basis:

| | Parts by weight |
|---|---|
| Cellulose acetate butyrate (26% butyral, 20.5% acetyl, 2.5% hydroxyl, 900–1350 centipoises) | 100 |
| "Admex" 710, epoxidized triglyceride of soya bean oil | 50 |
| "Uformite" F–200–E, butanol-modified urea-formaldehyde resin | 100 |
| Dibutyl phthalate | 25 |
| Monobutyl acid orthophosphate | 10 |

EXAMPLE XVII

A lacquer was prepared by dissolving the following solid components in the solvent on an 80/20 solvent-to-solids weight basis:

| | Parts by weight |
|---|---|
| Ethyl cellulose (42.5–43.5% ethoxyl, 22 centipoises) | 100 |
| "Estynox" 308, the epoxide of the acetylated triglyceride of castor oil manufactured by Baker Castor Oil Co. (epoxide value 0.181, molecular weight 1,081) | 100 |
| "Uformite" F–200–E, butanol-modified urea-formaldehyde resin | 50 |
| Dibutyl phthalate | 25 |
| Monobutyl acid orthophosphate | 5 |

The preparation of a variety of representative coating compositions of the present invention has been described and illustrated in the foregoing examples. Examples XVIII and XIX which follow, together with Tables 1 and 2, show the improved solvent and chemical resistance of an exemplary number of these new coating compositions.

EXAMPLE XVIII

Several nitrocellulose-based coating compositions prepared in accordance with the present invention and several typical, otherwise comparable, commercially-available coating compositions were applied to unprimed wood panels by a suction-type spray gun at room temperature. The coating compositions were flashed at room temperature (25°–30° C.) for one-half hour and then force-dried at 80° C. for one hour. The thickness of each dry film was approximately 2 mils. Five drops of each of a variety of solvents and chemicals were applied to each of the coated panels four days after force drying of the coating composition. To prevent evaporation, the solvents and chemicals were covered with a watchglass for one hour after which the panels were washed with soap and water and wiped with a cloth wet with naphtha. The condition of the coating on the panels was then observed. Table 1 which follows contains a summary of the effect upon the coated panels of the various solvents and chemicals. A key to the abbreviations used directly follows the table.

Table 1

APPEARANCE OF LACQUERS ON WOOD PANELS AFTER EXPOSURE TO VARIOUS CHEMICALS FOR ONE HOUR

| Coating compositions | Ethyl acetate (85–88%) | Acetone | Methanol | SD-2B ethanol | Ether | Chloroform | CCl4 | HCHO (36.8%) | Phenol | Acetic acid (99.7%) |
|---|---|---|---|---|---|---|---|---|---|---|
| Lacquer of Ex. I | Tr | Tr | Tr | — | — | — | — | — | — | Sl |
| Lacquer of Ex. II | Tr | Tr | Tr | — | — | — | — | — | Sl | Hvy |
| Lacquer of Ex. III | Tr | — | — | — | — | — | — | — | Sl | Sl |
| Lacquer of Ex. IV | Tr | — | — | — | — | — | — | — | — | Tr |
| NC Lacquer "A" [2] | Hvy | Hvy | VHvy | Mod | Sl | VSl | — | — | VHvy | VHvy |
| NC Lacquer "B" [3] | Hvy | Hvy | Hvy | Hvy | Sl | Tr | Tr | — | Sl | VHvy |
| U-F Varnish [4] | — | — | — | — | — | — | — | — | VHvy | Tr |

| Coating compositions | H₂SO₄ | HNO₃ (30%) | NaOH (30%) | Toluene | HCl (37%) | NH₄OH (29%) | Hot water [1] |
|---|---|---|---|---|---|---|---|
| Lacquer of Ex. I | — | — | — | — | LDis., OK | MDis., OK | — |
| Lacquer of Ex. II | — | — | — | — | — | — | — |
| Lacquer of Ex. III | — | — | — | — | — | — | — |
| Lacquer of Ex. IV | — | LDis., OK | — | — | — | MDis., OK | — |
| NC Lacquer "A" [2] | — | — | Sl | Sl | — | MDis., OK | — |
| NC Lacquer "B" [3] | — | — | MDis., bad | — | LDis., bad | MDis., OK | — |
| U-F Varnish [4] | — | DDis., OK | Tr | — | MDis., bad | — | — |

NOTE.—Key to ratings:
 —=No evidence of attack.
 Tr=Trace attack, film protectiveness unimpaired.
 VSl=Very slight attack, film protectiveness unimpaired.
 Sl=Slight attack, film protectiveness unimpaired.
 Mod=Moderate attack, film protectiveness damaged.
 Hvy=Heavy attack, film destroyed.
 VHvy=Very Heavy attack, film destroyed.
 LDis=Light discoloration.
 MDis=Medium discoloration.
 DDis=Dark discoloration.
 OK=Film gloss and protectiveness unimpaired.
 Bad=Film gloss and/or protectiveness damaged.

[1] Hot water exposure was for 5 minutes at 190–205° F.
[2] NC Lacquer "A" is "Duco" 15200, an alkyd-modified commercial nitrocellulose lacquer manufactured by E. I. duPont de Nemours & Co.
[3] NC Lacquer "B" is a commercial straight nitrocellulose lacquer.
[4] U-F Varnish is "Dulux" RK-5200, a commercial varnish manufactured by E. I. duPont de Nemours & Co.

EXAMPLE XIX

The procedure of Example XVIII was repeated in connection with a number of the new coating compositions and comparable representative commercially-available compositions having cellulose derivative film-formers other than nitrocellulose. The effect of the various chemicals and solvents on the coatings was observed, as in Example XVIII. Table 2 which follows contains a summary of the results of these tests. A key to the abbreviations used directly follows the table.

a substantial extent unattacked and unaffected by the solvents and chemicals referred to in the tables. The conventional cellulose derivative lacquer compositions, however, are severely attacked by esters, ketones, alcohols, phenol and acetic acid, whereas a commercial urea-formaldehyde varnish is severely attacked by phenol, nitric acid and hydrochloric acid.

As noted, above, the epoxidized material may be either epoxidized triglyceride of soya bean oil or epoxidized

Table 2

APPEARANCE OF LACQUERS ON WOOD PANELS AFTER EXPOSURE TO VARIOUS CHEMICALS FOR ONE HOUR

| Coating compositions | Ethyl acetate (85–88%) | Acetone | Methanol | Phenol | Acetic acid (99.7%) | HNO₃ (30%) | HCl (37%) | NaOH (20%) | NH₄OH (28%) |
|---|---|---|---|---|---|---|---|---|---|
| Lacquer of Example XI | Sl. | Sl. | Mod. | Mod. | V.Hvy. | Dis., bad | Nil | V.Hvy. | Nil |
| Lacquer of Example XV | Tr. | Nil | Nil | Mod. | Mod. | H.Dis., bad | Nil | H.Dis., bad | Nil |
| Typical conventional ethyl cellulose lacquer "C" [1] | V.Hvy. | V.Hvy. | V.Hvy. | V.Hvy. | Hvy. | Dis., OK | Tr. | V.Hvy. | Tr. |
| Lacquer of Example XIII | V.Sl. | Tr. | Mod. | Nil | Hvy. | H.Dis., bad | Nil | M.Dis., bad | Tr. |
| Lacquer of Example XVI | Tr. | Tr. | Sl. | Nil | Mod. | Dis., bad | Nil | H.Dis., bad | Nil |
| Typical conventional cellulose acetate butyrate lacquer "D" [2] | Hvy. | Hvy. | Hvy. | V.Hvy. | V.Hvy. | V.Hvy. | V.Hvy. | L.Dis., OK | Tr. |

NOTE: Key to ratings:
 Nil=No evidence of attack.
 Tr.=Trace attack, film protectiveness unimpaired.
 V.Sl.=Very slight attack, film protectiveness unimpaired.
 Sl.=Slight attack, film protectiveness unimpaired.
 Mod.=Moderate attack, film protectiveness damaged.
 Hvy.=Heavy attack, film destroyed.
 V.Hvy.=Very Heavy attack, film destroyed.
 L.Dis.=Light discoloration.
 M.Dis.=Medium discoloration.
 D.Dis.=Dark discoloration.
 OK=Film gloss and protectiveness unimpaired.
 Bad=Film gloss and/or protectiveness damaged.

[1] Ethyl cellulose (ethoxyl content 46.8–48.5%, viscosity 22 cps.)—100 parts by weight; ester gum—100 parts by weight; raw castor oil—30 parts by weight, dispersed on an 80/20 solvent-to-solids weight basis in the solvent system of Examples XIII–XXIII, above.
[2] Cellulose acetate butyrate (26% butyral, 20.5% acetyl, 2.5% hydroxyl, viscosity 900–1350 cps.)—100 parts by weight; "Santalite MHP" aryl sulfonamide-formaldehyde resin manufactured by Monsanto Chemical Co.—50 parts by weight; dibutyl phthalate—50 parts by weight; dispersed on an 80/20 solvent-to-solids weight basis in the solvent system of Examples XIII–XXIII, above.

It will be readily apparent from Tables 1 and 2 that the coating compositions of the present invention are to acetylated triglyceride of castor oil, which are obtained as the reaction products of hydrogen peroxide or peracetic acid with unsaturated fatty acid esters and the oils, as disclosed in vol. 67, J. Am. Chem. Soc. (1945), pp. 412–414.

The epoxidized material may be cured with a urea-formaldehyde, melamine-formaldehyde, or benzoguanamine-formaldehyde resin. The resins which are used are prepared by the condensation of urea or the triazine with formaldehyde in the presence of a monohydric aliphatic alcohol, such as propanol or butanol. The condensation may be promoted by the presence of an acid or other catalyst such as mercuric, aluminum, ferric or stannic chlorides, acid resins, halogens, etc., as described in U.S. Patents 2,191,957 and 2,201,891, and U.S. Patent 2,364,172 (col. 2, lines 3–11). Such resins are well known in the art as alkanol-modified urea-, melamine-, and benzoguanamine-formaldehyde resins, and for purposes of the present invention would characteristically contain in combined form from about one-half to about one molecule of the alcohol and about 2 molecules of formaldehyde for each molecule of urea, melamine, or benzoguanamine. In some cases, resins having as much as 1.5 molecules of the alcohol per molecule of urea, melamine, or benzoguanamine or the triazine may be used.

As indicated above, the present invention relates to improved cellulose derivative coating compositions, and the new compositions will therefore contain, in addition to the foregoing components, an organic-solvent soluble cellulose derivative film-former such as nitrocellulose, ethyl cellulose, cellulose acetate, cellulose acetate butyrate, cellulose acetate propionate, benzyl cellulose, or the like. Especially good results have been obtained with nitrocellulose-based compositions, and these represent the much preferred embodiment of the invention. However, the invention is operative and advantageous in connection with the other organic-solvent soluble cellulose derivative film-formers, as is illustrated by the foregoing examples. It is within the scope of the invention to prepare novel coating compositions of the type described having film-forming components containing two or more different cellulose derivatives, or a cellulose derivative mixed with portions of a non-cellulosic film-former, such as an alkyd resin or the like.

With nitrocellulose lacquers, the nitrocellulose used will generally contain from about 10.7% to about 12.2% nitrogen and will have a viscosity between about 1/8 second and 100 seconds as determined by standard methods (ASTM method D 301–50). Type HB 14 E nitrocellulose manufactured by E. I. du Pont de Nemours and Company, Inc. illustrated in a number of the examples is a typical suitable commercially-available nitrocellulose.

With ethyl cellulose lacquers, any conventional lacquer-grade ethyl cellulose may be used, such as ethyl cellulose products having an ethoxyl content between about 42 and 50% and a viscosity of about 7–200 centipoises. Similarly, any commonly used lacquer-grade cellulose acetate butyrate may be used as the film-former, including, for example, such products having a viscosity of from about 80–360 centipoises and ester group contents in the following general ranges: butyral 17–48%, acetyl 6–29.5%, hydroxyl 0.7–2.5%.

The coating composition may frequently also contain a plasticizer for the cellulose derivative which may be any conventional plasticizer frequently used for these materials, such as dibutyl phthalate, tricresyl phosphate, di(2-ethyl hexyl) phthalate, dibutyl sebacate, castor oil, modified castor oils, camphor, or the like. However, in some cases a plasticizer will not be used depending upon the properties desired in the final coating. The epoxidized triglyceride of soya bean oil and the epoxidized acetylated triglyceride of castor oil, if used in sufficient amounts, may themselves serve as a plasticizer for the cellulose derivative. In such cases, sufficient amounts will be added to provide for plasticization of the cellulose derivative in addition to enhancement of the solvent and chemical resistance of the lacquer.

To increase the rate of cure of the epoxidized material with the urea-, melamine-, or benzoguanamine-formaldehyde resin, a suitable catalyst may be used. Because of the tendency of nitrocellulose to degrade in the presence of basic substances, neutral or acidic catalysts, such as citric acid or monomethyl, monoethyl, monobutyl, or other mono-lower alkyl acid orthophosphate, are preferred for this purpose with the nitrocellulose lacquers. With the other cellulose derivatives, any suitable catalyst may be used.

In addition to the foregoing components, nitrocellulose lacquers prepared in accordance with the present invention may contain a cross-linking agent for the nitrocellulose, such as titanium ethyl acetoacetate, in which case an acid gel inhibitor is also used, such as pyromellitic acid. Other cross-linking agents for the nitrocellulose are operable as, for example, those described in U.S. Patents 2,680,108 and 2,686,133. The coating compositions of the present invention may also contain any of a wide variety of other conventional compounding ingredients for such compositions including, for example, dyes, pigments, stabilizers, anti-settling agents, dispersion aids, and the like.

The coating compositions of the present invention have all the desirable properties of conventional cellulose derivative lacquers coupled with superior resistance to attack by such solvents and chemicals as alcohols, esters, ketones, aldehydes, aromatic and aliphatic hydrocarbons, chlorinated hydrocarbons, organic and mineral acids, and alkalies. The compositions dry tack-free in air with good physical properties and require a low bake curing cycle only to effect the chemical resistance. The coating compositions also have excellent physical properties including, for example, color stability on exposure to ultra-violet light and adhesion to wood, steel and aluminum. The coatings formed with these compositions are quite flexible, extremely hard, and have excellent impact resistance when compared with many commercially available lacquer compositions. A comparison of some of the physical properties of films formed from typical coating compositions prepared in accordance with the present invention with films formed from conventional prior art lacquers will be found in Table 3.

*Table 3*

PHYSICAL PROPERTIES ON UNPRIMED PANELS

| Coating composition | Adhesion [1] (Percent) | | 20″ Impact [2] | | Flexibility [3] (1/8″ mandrel) | | Pencil hardness [4] Eagle "Turquoise" |
| --- | --- | --- | --- | --- | --- | --- | --- |
| | Steel | Aluminum | Steel | Aluminum | Steel | Aluminum | |
| Lacquer prepared according to U.S. Military Specification MIL-L-19537 (Aer.) of June 7, 1956, as amended March 4, 1957. | 0 | 0 | F | F | F | F | 5B. |
| Lacquer prepared according to U.S. Military Specification MIL-L-19538 (Aer.) of June 7, 1956, as amended March 4, 1957. | 0 | 0 | F | F | F | F | 3B. |

See footnotes at end of table.

Table 3—Continued
PHYSICAL PROPERTIES ON UNPRIMED PANELS

| Coating composition | Adhesion [1] (Percent) | | 20" impact [2] | | Flexibility [3] (⅛" mandrel) | | Pencil hardness [4] Eagle "Turquoise" |
|---|---|---|---|---|---|---|---|
| | Steel | Aluminum | Steel | Aluminum | Steel | Aluminum | |
| Lacquer prepared according to Example XII | 100 | 86 | O.K. | O.K. | O.K. | O.K. | M. |
| Typical conventional ethyl cellulose lacquer [5] | 100 | 0 | F | F | O.K. | O.K. | HB. |
| Lacquer prepared according to Example XIII | 100 | 100 | O.K. | O.K. | O.K. | O.K. | HB. |
| Typical conventional cellulose acetate butyrate lacquer.[6] | 0 | 0 | O.K. | O.K. | O.K. | O.K. | 6B. |

NOTE.—Key to ratings:
O.K.=Coating did not fail.
F=Coating failed.

[1] Adhesion: "Scotch Tape" test—described in U.S. Patent 2,751,316 (column 2, lines 53–64).
[2] Impact: DuPont-Parlin type impact tester—described in Gardner and Sward, "Physical and Chemical Examination of Paints, Varnishes, Lacquers, and Colors" (10th ed.), p. 173.
[3] Flexibility: ⅛" mandrel test—described in Gardner and Sward, "Physical and Chemical Examination of Paints, Varnishes, Lacquers, and Colors" (10th ed.), p. 171.
[4] Pencil Hardness: Off. Dig. Fed'n. P & V Prodn. Clubs 28 No. 374, March 1956, pp. 232–237, W. T. Smith.
[5] Same as lacquer "C", Table 2.
[6] Same as lacquer "D", Table 2.

As noted above, the catalyst (where used) which promotes the curing of the epoxidized material is not compounded with the other components of the lacquer at the time of manufacture. It is added later by the consumer, for example, usually about 1–24 hours before the lacquer is used; the shelf-life of the thus catalyzed lacquers depends on the specific formulation and storage conditions and may be as high as two months or more.

After the composition is applied to the surface which is to be coated, the epoxidized material is cured by a low-bake curing cycle at a temperature anywhere in the range of about 50° to 125° C. for a period of about ½ to 8 hours.

Based upon a solids composition containing 100 parts by weight of the cellulose derivative, the epoxidized material will be used in an amount of about 50 to 100 parts by weight whereas the urea-formaldehyde, melamine-formaldehyde, or benzoguanamine formaldehyde resinous curing agent will be used in an amount of about 8 to 50 parts by weight depending upon the amount of epoxidized material present and the specific properties desired in the coating composition end product. When a catalyst is used to promote the curing of the epoxidized material, the catalyst will be present in amounts of about 3 to 15 parts by weight, based on 100 parts by weight of the cellulose derivative. As noted above, the cellulose derivative may or may not be plasticized. There may thus be present anywhere from 0 to about 80 parts of cellulose derivative, per 100 parts by weight of plasticizer depending on the type and grade of cellulose derivative employed and the properties desired in the finished product. Coating compositions which are intended to be used on rigid substrates, such as metal surfaces, will contain lesser amounts of plasticizer, and in some cases, no plasticizer at all. On the other hand, coating compositions which are to be applied to flexible substrates, such as leather and the like, will often be highly plasticized in order to impart the necessary flexibility to the coating. The amount of plasticizer to be used in any particular instance may thus vary widely within the indicated range depending upon the nature, properties, and function of the surface to be coated.

Where a cross-linking agent for the nitrocellulose and an acid gel inhibitor are used (in the case of nitrocellulose lacquers), these materials will generally be present in amounts of about 1.5–8.0 and 0.1–11.5 parts by weight, respectively, per 100 parts of nitrocellulose.

As used in this specification, the term "epoxide value" refers to gram equivalents of epoxide per 100 grams of epoxidized material.

This application is a continuation-in-part of our prior copending application Serial Number 720,091, filed March 10, 1958, now abandoned.

Having thus described our novel coating compositions, it will be readily apparent to those skilled in the art that many changes and modifications may be made in the particular procedures and compositions described without departing from the spirit of the invention. We therefore intend to be limited only by the following claims.

We claim:

1. A coating composition comprising an organic solvent solution of (a) a cellulose derivative film-former, (b) an epoxy composition from the group consisting of epoxidized triglyceride of soya bean oil and epoxidized acetylated triglyceride of castor oil, and (c) a resinous curing agent for the epoxy composition selected from the group consisting of the alkanol-modified urea-formaldehyde, melamine- formaldehyde and benzoguanamine-formaldehyde resins, the ratio of (b) to (a) being about 50–100/100, and the ratio of (c) to (a) being about 8–50/100.

2. A composition as in claim 1 which contains up to 80 parts by weight of a plasticizer for the cellulose derivative per 100 parts of the latter.

3. A composition as in claim 2 wherein the cellulose derivative is nitrocellulose.

4. A composition as in claim 2 wherein the cellulose derivative is ethyl cellulose.

5. A composition as in claim 2 wherein the cellulose derivative is cellulose acetate butyrate.

References Cited in the file of this patent

UNITED STATES PATENTS

| 2,732,367 | Shokal | Jan. 24, 1956 |
| 2,754,285 | Petropoulos | July 10, 1956 |
| 2,843,560 | Mika | July 15, 1958 |

FOREIGN PATENTS

| 141,457 | Switzerland | Oct. 1, 1930 |